Patented Apr. 28, 1925.

1,535,445

UNITED STATES PATENT OFFICE.

JOSEPH HAY AMIES, OF PHILADELPHIA, PENNSYLVANIA.

METHOD OF PREPARING A CEMENTITIOUS COMPOSITION.

No Drawing.   Application filed January 29, 1921.   Serial No. 441,087.

*To all whom it may concern:*

Be it known that I, JOSEPH HAY AMIES, a citizen of the United States, residing at the city of Philadelphia, in the county of Philadelphia and State of Pennsylvania, have invented a certain new and useful Method of Preparing a Cementitious Composition, of which the following is a specification.

In the practice of the present invention the cementitious composition is usually prepared in a standard concrete mixing machine, although obviously the composition may be otherwise mixed. For the sake of illustration the following description will be restricted to the preparation of the composition in a mixing machine. It will be understood that the mixing of the ingredients about to be mentioned is continuous. Sufficient water is placed in the mixing machine to enable the finished batch of material to be readily poured therefrom. To the water within the mixer is added $\frac{1}{85}$ part, more or less, of an alkaline salt, readily soluble in water, as soda ash, sal soda, bicarbonate of soda or the like. One of the purposes of adding the alkaline salts is to soften the water. The water thus softened will more readily penetrate the earthy material (hereinafter to be described) to cause disintegration of the same. To the resultant alkaline mixture is added 5 parts more or less, of earthy material. The earthy material may be in comminuted form. In the agitation of the mixing machine the earthy material is readily disintegrated in water because of the softened condition of the water as above described. Non-comminuted soil which is water moistened, thus making it capable of more ready disintegration in water, may be employed. While the process of manufacture would be slower earthy material which is neither comminuted or water moistened may be used. No particular variety of earthy material is necessary and the soil as found at the place where the cementitious composition is employed may be utilized. The earthy material may consist of clay and loam associated with granular matter incapable of disintegration in water, or it may be earthy material free of such granular matter. In any event, the earthy material will contain more or less acids. Another purpose of the alkaline solution is to aid in neutralizing such acids. To the mass is now added ½ part, more or less, of hydroxide of calcium. One of the purposes of the hydroxide of calcium is to assist in the neutralizing of the acids contained in the earthy material. Its particular purpose, however, is to so prepare the earthy material that the alkaline cement hereinafter mentioned, will fully set thereto. It has been found by first adding the alkaline salts to the water, then adding the soil, then adding the hydroxide of calcium and then adding the alkaline cement, that better results are obtained than by mixing the salts, hydroxide and alkaline cement together and then placing them at one time in the water and soil within the mixer. The presence of the alkaline salts and the hydroxide of calcium serves to promote a full alkaline reaction. There is now added to the mass ½ part, more or less, of an alkaline cement as for instance Portland cement. The purpose of the alkaline cement is to aid in hardening the mass and to prevent the same from softening in or by water. In fact, the Portland cement will cause the mass to harden under water. While the water in the mixing machine serves to prevent the batch from adhering to the machine paddles and generally serves to prevent clogging of the machine interior, I find that unless the batch is made sufficiently thin with water, it is difficult to expel the composition from the machine. If the batch is sufficiently thin with water to readily pour from the machine it will be impossible to compress the composition after being placed into position, before the initial set begins, and it will greatly lessen the set to do so afterwards. On the other hand, owing to the rotary action of the mixer, if the batch is semi-dry it forms into balls and cannot be readily removed from the machine. Because of its adhesive nature it has a tendency to adhere to the paddles and clog the mixer interior. Further, it is very difficult in this condition to handle it for constructive work owing to the fact that it will quickly harden and in an uneven manner. To overcome this disadvantageous feature I add to the mass within the mixing machine just prior to its removal therefrom, $\frac{1}{12}$ part, more or less, of granulated oxide of calcium. The slaking of the oxide of calcium may be assisted by the addition of a small quantity of boiling water before being added to the mass within the machine. After the batch has been removed from the machine and before the initial set has begun within the composition the oxide of calcium will have taken up a sufficient amount of water contained in the batch and converted the same. The composition is now in a suitable condition to accept compression. If I should use oxide of calcium alone instead of using hydroxide of calcium therewith, the mass becomes too granular and dry and would be very hot. In this condition the alkaline cement will not react.

One of the most serious difficulties with cementitious compositions is to procure a sufficiently solid compression. If I place my composition in molds or formers, without compression, it becomes very porous when set, and contains many voids. This condition is caused by the evaporation of the unconverted water. The composition in this condition is much less resistant, when set, than when solidly compressed. Moreover, if the composition is exposed, these voids, being filled with water, cause the composition to crack and granulate during freezing temperature. From this it will be seen how very important it is to add the oxide of calcium to the composition. The oxide of calcium will not only take up and convert enough of the water to stiffen the mass but it will expand within the body of the composition to such an extent as to fill the voids with mineral matter, and this enables me to secure a very solid compression of the composition.

I have found that about one part sand mixed with four parts of the alkaline cement, above mentioned, dampened with water to make a stiff mortar, when added to the mass within the mixer just prior to pouring the batch serves to increase the set of the composition. This step is advised where it is desired to apply the composition in arts demanding increased resistance. The sand becames thickly coated with the damp alkaline cement and adheres thereto and the alkaline cement reacts upon the same with full strength and results in procuring an increased set in association with the soil.

What I claim is:

1. The method of preparing a cementitious composition which consists in disintegrating earthy material in water and thereafter adding thereto and mixing therewith hydroxide of calcium, and a cement adapted to harden and set the mass and to prevent the same from softening in or by water.

2. The method of preparing a cementitious composition which consists in disintegrating earthy material in water and mixing therewith hydroxide of calcium to aid in neutralizing the acids contained in said earthy material and then adding thereto and mixing therewith Portland cement adapted to harden and set the mass and to prevent the same from softening in or by water.

3. The method of preparing a cementitious composition which consists in preparing an alkaline mixture by the admixture of water and an alkaline salt adding thereto and mixing therewith earthy material to cause disintegration thereof the said alkaline mixture serving to aid in neutralizing the acids contained in said earthy material, then adding thereto and mixing therewith hydroxide of calcium and finally adding to the mass and mixing therewith Portland cement which cement associates with hydroxide of calcium to produce a full alkaline reaction.

4. The method of preparing a cementitious composition which consists in preparing an alkaline mixture by the admixture of water and an alkaline salt, then adding thereto and mixing therewith earthy material to cause disintegration thereof, the said alkaline mixture serving to neutralize the acids contained in said earthy material then adding thereto and mixing therewith, hyroxide of calcium, and finally adding to the batch and mixing therewith Portland cement associated with clean sharp sand and water to procure a full alkaline reaction, the cement, sand and water being mixed together prior to addition to the batch.

5. The method of preparing a cementitious composition which consists in first disintegrating earthy material in water, then adding thereto and mixing therewith Portland cement to harden and set the mass and render the same insoluble in water and finally adding to the mass granulated oxide of calcium in order to prepare the mass to properly accept compression before the initial set begins.

6. The method of preparing a cementitious composition which consists in taking earthy material in which is associated loam and clay containing granular matter not capable of disintegration in water and mixing therewith water and an alkaline agent to disintegrate the loam and clay and then adding thereto and mixing therewith Portland cement to harden the mass and to prevent it from softening in or by water.

7. The method of preparing a cementitious composition which consists in taking $\frac{1}{65}$ part, about of an alkaline salt and mixing the same with enough water to enable the finished mass to be poured, then adding to the alkaline mixture thus formed, and mixing therewith 3 parts, about of earthy material, then mixing therewith $\frac{1}{2}$ part about of hydroxide of calcium, then mixing therewith $\frac{1}{2}$ part, about of Portland cement and finally adding to the mass $\frac{1}{12}$ part, about, of granulated oxide of calcium.

In testimony whereof, I have hereunto signed my name.

JOSEPH HAY AMIES.